UNITED STATES PATENT OFFICE.

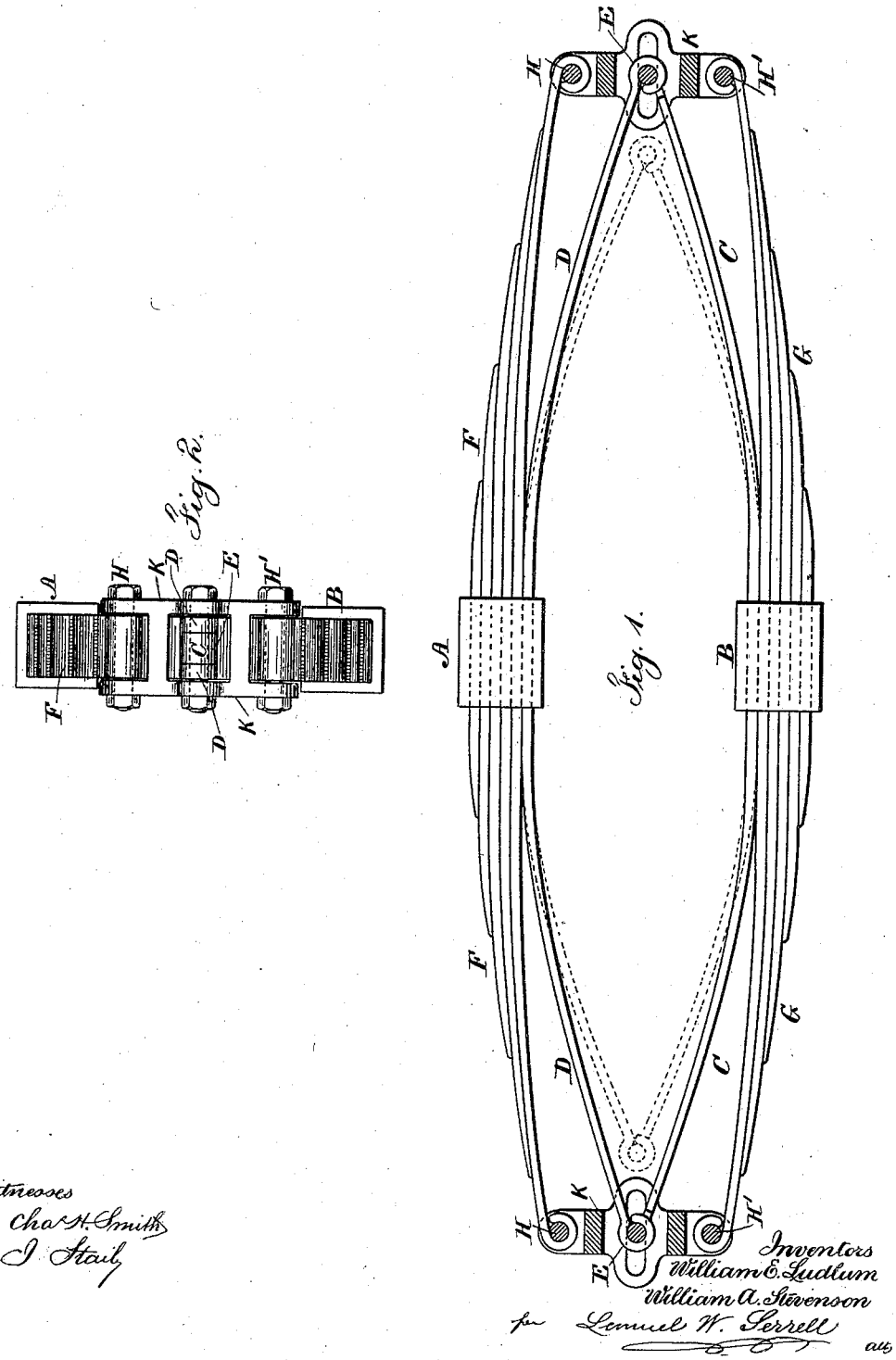

WILLIAM E. LUDLUM, OF POMPTON, NEW JERSEY, AND WILLIAM A. STEVENSON, OF NEW HAVEN, CONNECTICUT.

VEHICLE-SPRING.

SPECIFICATION forming part of Letters Patent No. 344,785, dated June 29, 1886.

Application filed May 24, 1886. Serial No. 203,102. (No model.)

*To all whom it may concern:*

Be it known that we, WILLIAM E. LUDLUM, of Pompton, in the county of Passaic and State of New Jersey, and WILLIAM A. STEVENSON, of New Haven, in the county of New Haven and State of Connecticut, have invented an Improvement in Springs for Vehicles, of which the following is a specification.

In ordinary elliptic springs considerable curvature is necessary to prevent the spring closing and producing concussion when in use. If the leaves of a spring are straight or nearly straight, the spring is much easier in its motion and less liable to break.

The object of the present invention is to obtain a substitute for the ordinary elliptic spring, and in which the leaves will be flat or nearly straight in the ordinary condition of use, and they will be arched in one direction by less than the normal load, and nearly straight or slightly bent in the other direction by greater than the normal load, and still have sufficient play for all the movements to which they are subjected in use.

With this object in view we construct the principal portions of the spring of leaves that are slightly arched, and the ends of the spring are connected together, but kept sufficiently distant, by thrust-bars, the weight being taken endwise upon such thrust-bars, and we combine with the foregoing parallel-motion springs, which maintain the proper relative position between the top and bottom portions of the spring, so that the thrust-bars may not swing laterally under the endwise pressure to which they are exposed.

In the drawings, Figure 1 is an elevation, partly in section, of our improved spring; and Fig. 2 is an end view of the same.

The clip-pieces A and B are adapted to receive and hold the several plates or leaves composing the spring, and there may be perforations through the leaves for the passage of bolts that hold the leaves together, as usual.

The parallel-motion springs C D are preferably elliptical, and united at their ends by pivotal connections E E, of any usual or desired character, and said springs C D are usually single; but they may be made of double plates. The object of these springs C D is to retain the parts A B in their proper position, so that the part A will move vertically above the part B. The leaves F G are nearly straight or flat. We have shown five leaves in each group; but there may be more or less in number. The longest leaves are made with eyes at their ends, and these are united by bolts H H' to the vertical thrust-bars K. These thrust-bars K keep the springs F G at the proper distance apart, and the springs are proportioned in strength to the weight, so that when loaded to the average extent the leaves of the springs F G will be straight, or nearly so, and when the load is increased the spring F will be curved upwardly and the spring G downwardly. We find that the leaves of the spring are less liable to breakage when they are straight, or nearly so, than they are when curved, as in the ordinary elliptic spring, and the motion of the spring is much easier than those before made.

The ends of the springs C D may stop short of the thrust-bars K, as indicated by dotted lines in Fig. 1; but we prefer to introduce in the thrust-bars K horizontal mortises or slots, and to extend the springs C D, so that the pins E of the joints pass through the horizontal slots, thereby allowing for the motions to the respective parts resulting from the addition of weight in the vehicles or the lessening of such weights.

If desired, the end connections between the springs F G may be curved instead of straight, and the longer leaves of the springs F G fastened thereto.

We claim as our invention—

1. The combination, with the clips A B, of the spring-leaves F G, that are nearly straight, and are received and held in the middle portions by the clips A B, and the thrust-bars K, that unite the respective springs F G at their ends, substantially as set forth.

2. The combination, with the clips A B and the spring-leaves F G, of the thrust-bars K, united to the ends of the springs F G, and having horizontal slots, and the parallel-motion springs C D and bolts E, which bolts E pass through the slots in the thrust-bars, substantially as set forth.

3. The combination, with the clips A B and the spring-leaves F G, of the thrust-bars uniting the outer ends of the springs, and the parallel-motion springs between the respective parts, substantially as set forth.

Signed by us this 14th day of May, A. D. 1886.

WILLIAM E. LUDLUM.
WILLIAM A. STEVENSON.

Witnesses:
HARRY W. ASHER,
A. HEATON ROBERTSON.